United States Patent
Kim

(10) Patent No.: US 9,166,232 B2
(45) Date of Patent: Oct. 20, 2015

(54) SOLID OXIDE FUEL CELL

(75) Inventor: Young Jung Kim, Seoul (KR)

(73) Assignee: MIM CERAMICS CO., LTD., Ansan-Si, Chungcheongnam-Do (KR)

( * ) Notice: Subject to any disclaimer, the term of this patent is extended or adjusted under 35 U.S.C. 154(b) by 363 days.

(21) Appl. No.: 13/880,404

(22) PCT Filed: Oct. 18, 2011

(86) PCT No.: PCT/KR2011/007747
§ 371 (c)(1),
(2), (4) Date: Apr. 26, 2013

(87) PCT Pub. No.: WO2012/053803
PCT Pub. Date: Apr. 26, 2012

(65) Prior Publication Data
US 2013/0202982 A1     Aug. 8, 2013

(30) Foreign Application Priority Data
Oct. 19, 2010   (KR) ........................ 10-2010-0101803

(51) Int. Cl.
H01M 8/02 (2006.01)
H01M 8/12 (2006.01)
H01M 8/24 (2006.01)

(52) U.S. Cl.
CPC .............. *H01M 8/0258* (2013.01); *H01M 8/02* (2013.01); *H01M 8/12* (2013.01); *H01M 8/24* (2013.01); *Y02E 60/50* (2013.01); *Y02E 60/521* (2013.01); *Y02E 60/525* (2013.01)

(58) Field of Classification Search
None
See application file for complete search history.

(56) References Cited

U.S. PATENT DOCUMENTS

2010/0035112 A1*   2/2010   Kim et al. ....................... 429/30

FOREIGN PATENT DOCUMENTS

| JP | 2004031158 | 1/2004 |
|----|------------|--------|
| JP | 2007157724 | 6/2007 |
| JP | 2009032649 | 2/2009 |
| KR | 1020040038751 | 5/2004 |
| KR | 100815207 | 3/2008 |

OTHER PUBLICATIONS

International Search Report mailed on Apr. 4, 2012 for PCT/KR2011/007747.
Written opinion from ISA mailed on Apr. 4, 2012.

* cited by examiner

*Primary Examiner* — Carlos Barcena
*Assistant Examiner* — Wojciech Haske
(74) *Attorney, Agent, or Firm* — Hauptman Ham, LLP

(57) ABSTRACT

A solid oxide fuel cell includes unit cells, a first side plate and a second side plate respectively attached to opposite lateral surfaces of the unit cells, and a first electricity collector and a second electricity collector arranged between the unit cells. Each of the unit cells includes a support body block. The support body block includes a first surface, a second surface parallel to the first surface, a plurality of first channels and a plurality of second channels existing between the first channels. Each of the unit cells further includes air electrodes formed on inner surfaces of the first channels, fuel electrodes formed on inner surfaces of the second channels, a first electricity collecting layer formed on the first surface and electrically connected to the air electrodes and a second electricity collecting layer formed on the second surface and electrically connected to the fuel electrodes.

6 Claims, 11 Drawing Sheets

SOLID OXIDE FUEL CELL

FIELD OF THE INVENTION

The present invention relates to a solid oxide fuel cell and, more particularly, to a highly-efficient solid oxide fuel cell having an increased electrode area per unit volume.

BACKGROUND OF THE INVENTION

A fuel cell is a device for converting a change in free energy caused by oxidation reaction of fuel to electric energy. As examples of the fuel cell, there have been developed a phosphate fuel cell, a polymer electrolyte fuel cell, a molten carbonate fuel cell and a solid oxide fuel cell.

The solid oxide fuel cell is capable of generating electric energy at a high temperature of 600° C. to 1,000° C. Therefore, the solid oxide fuel cell enjoys highest energy conversion efficiency among the fuel cells developed thus far. Thanks to the high energy conversion efficiency, the solid oxide fuel cell, if practically available, can become a substitute for the existing energy converters. If hydrogen is used as the fuel of the solid oxide fuel cell, it is possible to reduce emission of carbon dioxide ($CO_2$). It is therefore expected that the solid oxide fuel cell will be used as an energy source for a future energy system.

In the meantime, the solid oxide fuel cell is operable at a high temperature and is capable of causing reaction within a fuel electrode (anode). This provides an advantage in that the solid oxide fuel cell can use not only hydrogen but also other kinds of fuel such as a natural gas and a coal gas. Unlike the molten carbonate fuel cell, the solid oxide fuel cell does not use liquid electrolyte and does not suffer from problems of material corrosion, electrolyte loss and electrolyte supplement. Complex power generation can be performed through the use of high-quality waste heat dissipated from the solid oxide fuel cell. This makes it possible to enhance the efficiency of a power generation system as a whole.

The solid oxide fuel cell is composed of a unit cell including an oxygen ionic conductive electrolyte, an air electrode (cathode) and a fuel electrode (anode), latter two of which are arranged on the opposite surface of the electrolyte. If an air and reducing fuel such as hydrogen are supplied to the respective electrodes of the unit cell, reduction reaction of oxygen occurs in the air electrode, thereby generating oxygen ions. The oxygen ions move toward the fuel electrode through the electrolyte and react again with reducing fuel such as hydrogen supplied to the fuel electrode, thus generating water. At this time, electrons are generated in the fuel electrode and are consumed in the air electrode. Electricity can be obtained by interconnecting the fuel electrode and the air electrode.

The solid oxide fuel cell is largely divided into a tubular type and a planar type. The tubular type solid oxide fuel cell is disclosed in many different patent documents, e.g., KR10-0286779B and KR10-0344936B.

JP2004-31158A discloses a fuel cell in which a plurality of parallel channels is formed in an electrolyte support body and in which an air electrode and a fuel electrode are formed on the inner walls of each of the channels.

In the fuel cell disclosed in JP2004-31158A, a cap is arranged between an upper unit cell and a lower unit cell. The cap is provided to discharge an exhaust gas going through reaction in the unit cells. A plurality of discharge holes and an exhaust gas flow path are arranged in the cap so that an air and a fuel gas should not be mixed with each other. The fuel introduced passes through the fuel gas flow path, the discharge holes and the exhaust gas flow path. Then, the fuel is discharged to the outside. The air introduced passes through the air flow path, the discharge holes and the exhaust gas flow path. Thereafter, the air is discharged to the outside.

The cap has a plate shape. A rectangular exhaust gas flow path is formed in the central region of the cap. A plurality of discharge holes is formed in the position of the exhaust gas flow path corresponding to the fuel gas flow path or the air flow path. Thus, the cap has a structure substantially hard to manufacture.

The cap is not a power generating part. For that reason, there is a problem in that the power generation area per unit volume is reduced if the cap is arranged between the unit cells adjoining each other.

In the fuel cell disclosed in JP2004-31158A, the flow paths of upper and lower unit cells adjoining each other are not connected to each other. For that reason, the fuel introduced takes part in reaction only when passing through the channels of the unit cells of the respective layers. Thereafter, the fuel is discharged to the outside. In order to increase the reaction area of a fuel gas and an air and to enhance the power generation efficiency, it is necessary to increase the length of the fuel gas flow paths and the air flow paths of the unit cells, eventually increasing the size of the unit cells. In this case, however, the moving route of electrons becomes longer and the power generation efficiency grows lower. This poses a problem in that it is difficult to increase the power generation capacity. Moreover, a difficulty is involved in forming long channels in an electrolyte support body. It is also highly likely that defects are generated in the process of forming the long channels. In addition, there is a need to increase the size of the cap which is hard to manufacture.

Korean Patent No. 0815207 discloses a fuel cell in which a plurality of parallel channels is formed in an electrolyte support body and in which an air electrode and a fuel electrode are formed on the inner walls of the channels. In this fuel cell, passages are formed in the channels so as to interconnect air flow paths and fuel flow paths formed in upper unit cells and lower unit cells adjoining each other. With the structure of this fuel cell, electricity collecting plates have to be installed on the opposite side surface of each of the unit cells to which side plates are coupled. Therefore, each of the unit cells requires two electricity collecting plates. In general, the electricity collecting plates are made of an expensive metallic material. It is therefore necessary to reduce the number of the electricity collecting plates installed. Since the electricity collecting plates are installed on the opposite side surface of each of the unit cells, the distance from the air electrode and the fuel electrode formed on the inner surfaces of the channels distant from the side surfaces to the electricity collecting plates becomes longer. This poses a problem of increasing the moving distance of electrons.

SUMMARY OF THE INVENTION

Technical Problems

It is an object of the present invention to provide a solid oxide fuel cell having an increased power output per unit volume.

Another object of the present invention is to provide a solid oxide fuel cell capable of enjoying high power generation efficiency.

A further object of the present invention is to provide a solid oxide fuel cell which is structurally simple and easy to manufacture.

Means for Solving the Problems

In accordance with the present invention, there is provided a solid oxide fuel cell including unit cells, a first side plate and a second side plate respectively attached to opposite lateral surfaces of the unit cells, and a first electricity collector and a second electricity collector arranged between the unit cells.

Each of the unit cells each includes a support body block. The support body block includes a first surface, a second surface parallel to the first surface, a plurality of first channels extending in a first direction in a parallel relationship with the first surface and serving as flow paths through which an air flows and a plurality of second channels existing between the first channels and serving as flow paths through which fuel flows, the first channels having first-surface-side open ends and second-surface-side open ends, the second channels having first-surface-side open ends and second-surface-side open ends. Each of the unit cells further includes air electrodes (cathodes) formed on inner surfaces of the first channels, fuel electrodes (anodes) formed on inner surfaces of the second channels, a first electricity collecting layer formed on the first surface and electrically connected to the air electrodes and a second electricity collecting layer formed on the second surface and electrically connected to the fuel electrodes;

The unit cells are stacked one above another such that the first channels of the unit cells adjoining each other are connected to one another to form the flow paths through which the air flow and such that the second channels of the unit cells adjoining each other are connected to one another to form the flow paths through which the fuel flow. At this time, a lower one of the unit cells adjoining each other is combined with an upper one of the unit cells in a 180 degree rotated state. The first surfaces of the unit cells adjoining each other are arranged to face each other with the first electricity collector interposed therebetween. The second surfaces of the unit cells adjoining each other are arranged to face each other with the second electricity collector interposed therebetween.

Preferably, the lower surface of an upper one of the unit cells adjoining each other is in a mirror-symmetrical relationship with an upper surface of a lower one of the unit cells.

The first side plate and the second side plate are respectively attached to opposite lateral surfaces of the unit cells and are configured to close lateral ends of the first channels and the second channels.

The first electricity collector is electrically connected to the first electricity collecting layer and is arranged to partially close the first-surface-side open ends of the first channels of the unit cells. The second electricity collector is electrically connected to the second electricity collecting layer and is arranged to partially close the second-surface-side open ends of the second channels of the unit cells.

The electricity collectors are arranged to partially close the first channels and the second channels such that the air or the fuel flows zigzag along the first channels and the second channels.

Effect of the Invention

The solid oxide fuel cell according to the present invention provides the following effects.

First, there is no need to employ additional structures such as a cover and a cap which should otherwise be installed between an upper unit cell and a lower unit cell adjoining each other. It is therefore possible to increase a power output per unit volume.

Second, an air flow path and a fuel flow path adjoining in a parallel relationship with each other are formed in a support body block. It is therefore possible to reduce the thickness of an electrolyte layer and to increase the power generation efficiency.

Third, the flow paths of an upper unit cell and a lower unit cell adjoining each other are connected to each other. Therefore, the area in which an air and fuel react with each other until they are discharged can be adjusted by adjusting the number of stacks without having to change the shape of unit cells. Even if the operating temperature of the solid oxide fuel cell is low, it is possible to keep the power generation efficiency constant by increasing the number of stacks.

Fourth, the solid oxide fuel cell according to the present invention can be manufactured by forming an air flow path and a fuel flow path in a support body block to thereby produce unit cells having a self-supporting structure and then arranging and stacking electricity collecting plate between the unit cells. This makes it easy to manufacture the solid oxide fuel cell.

Fifth, the distance from the power generation part to the electricity collecting plate becomes shorter. It is therefore possible to reduce electric resistance and to increase the power generation efficiency.

Sixth, the solid oxide fuel cell is structurally simple. The lower surface of an upper layer and the upper surface of a lower layer coupled together are in a mirror-symmetrical relationship with each other. This makes it easy to perform sealing in a stacking process.

Seventh, the electricity collecting plate is arranged between an upper unit cell and a lower unit cell adjoining each other. Only one electricity collecting plate is used with respect to each of the unit cells. Therefore, as compared with the conventional solid oxide fuel cells, it is possible to reduce the number of electricity collecting plates used.

DETAILED DESCRIPTION OF THE PREFERRED EMBODIMENTS

A solid oxide fuel cell according to one embodiment of the present invention will now be described in detail with reference to the accompanying drawings.

Figure 1:
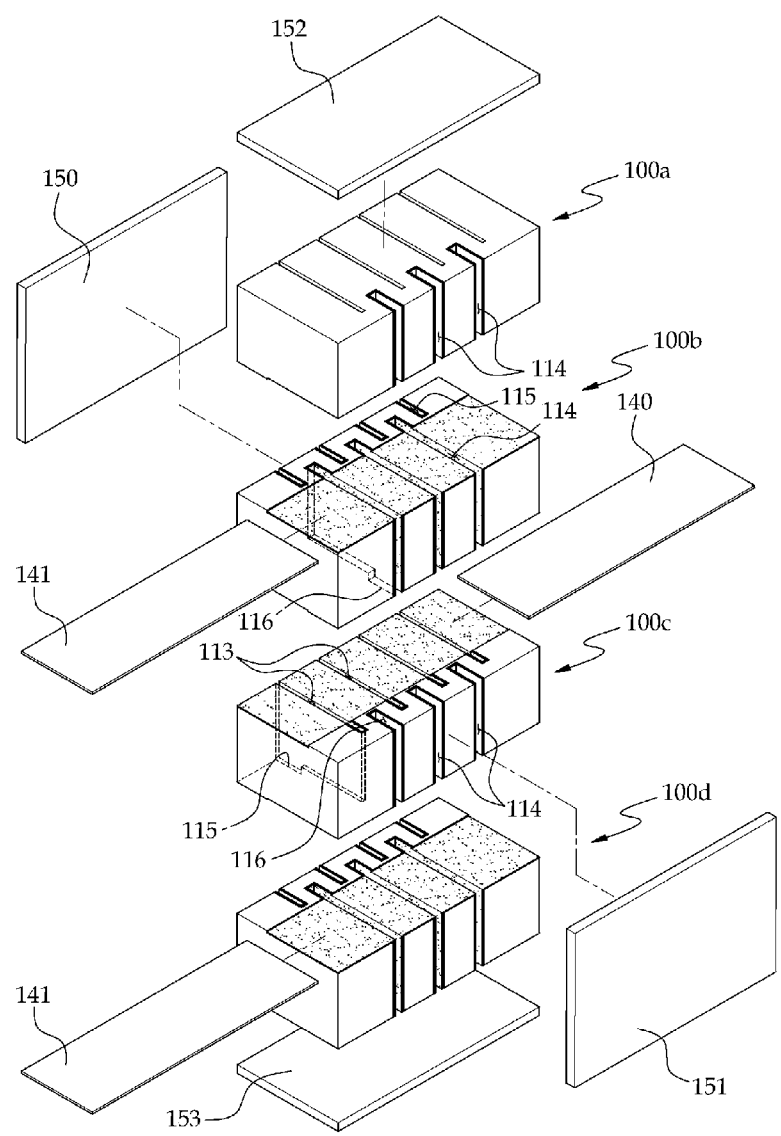
FIG. 1 is an exploded perspective view showing a solid oxide fuel cell according to one embodiment of the present invention.
Figure 2:
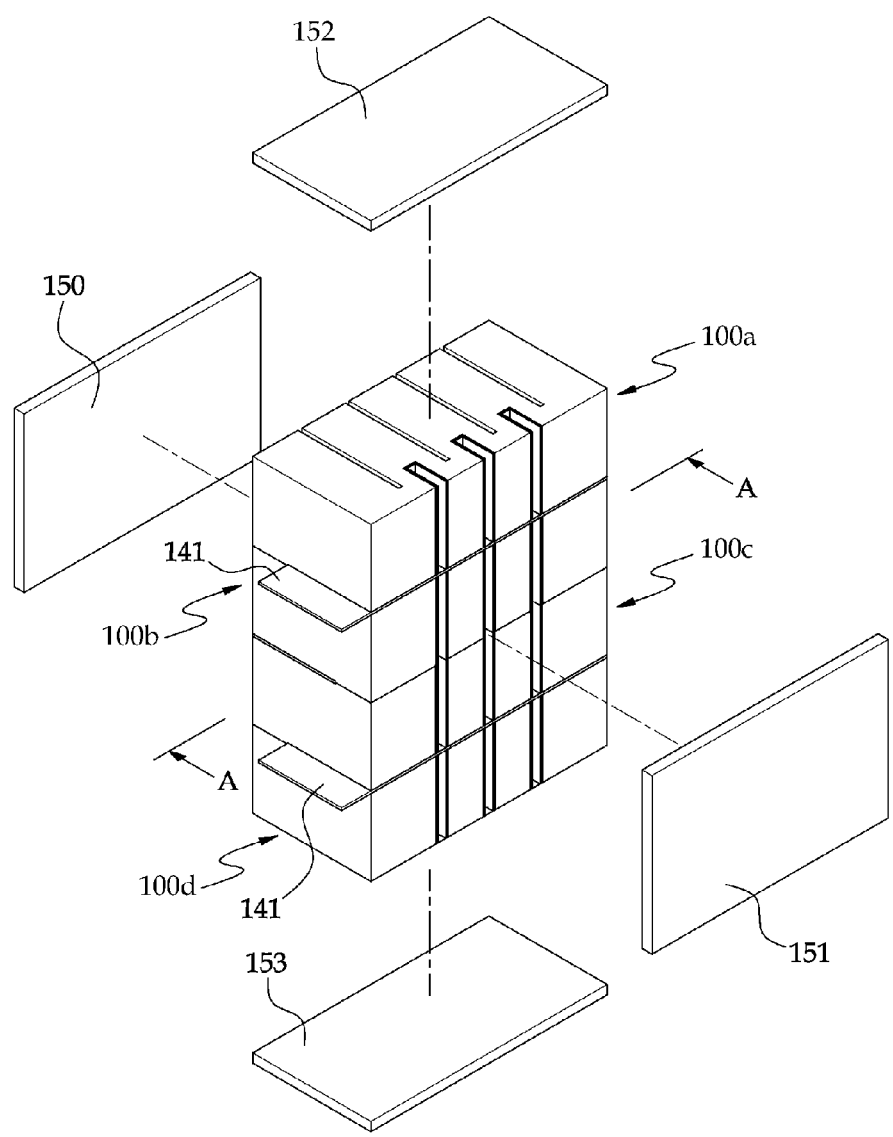
FIG. 2 is a perspective view illustrating a state that the unit cells of the solid oxide fuel cell shown in FIG. 1 are combined together.
Figure 3:
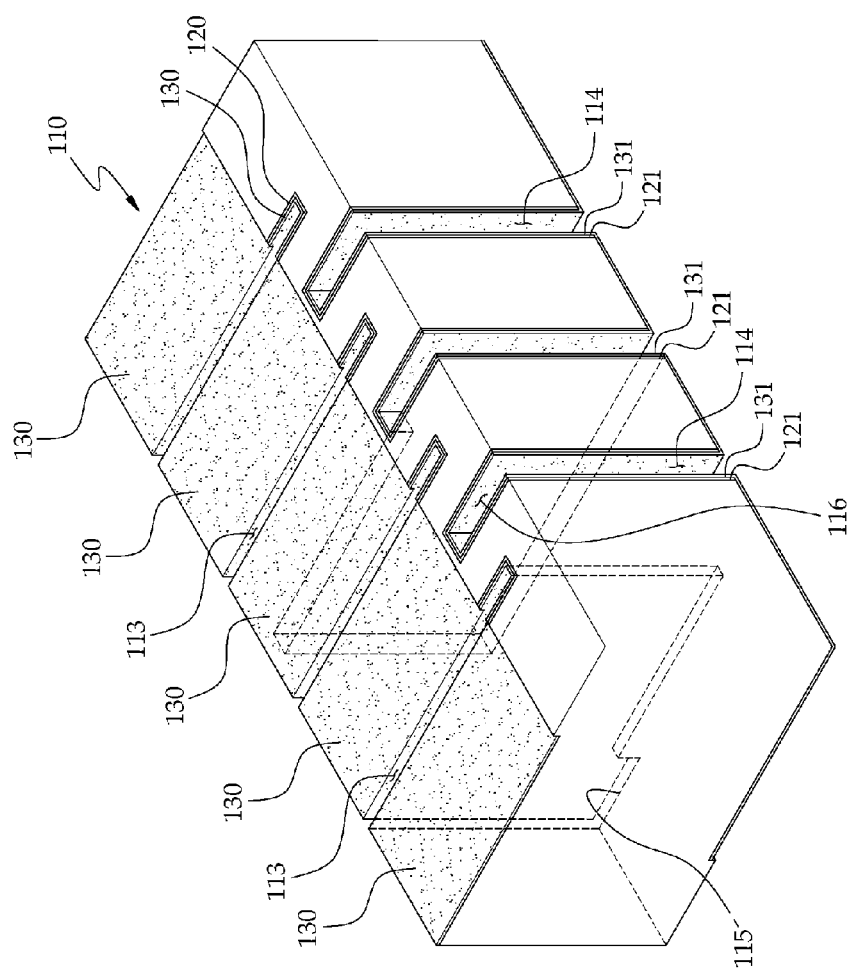
FIG. 3 is a perspective view showing one of the unit cells shown in FIG. 1.
Figure 4:
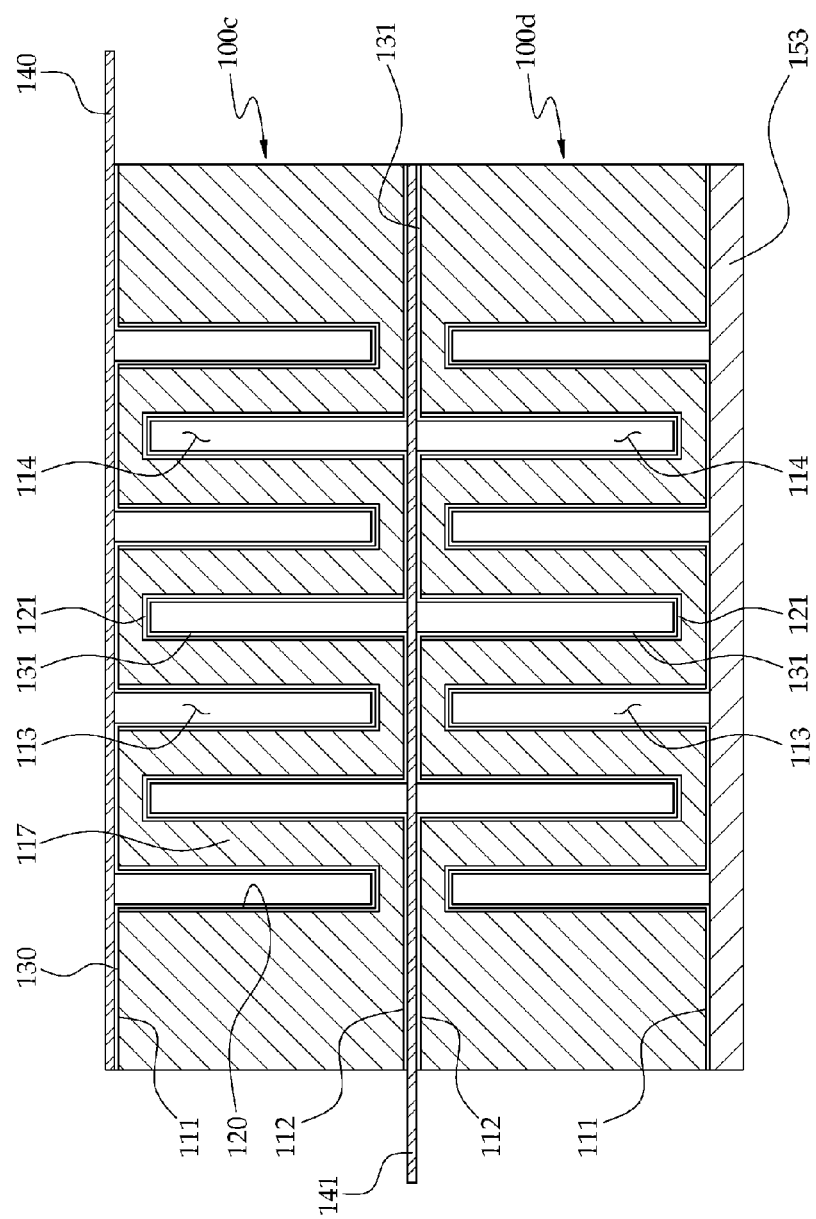
FIG. 4 is a section view of the solid oxide fuel cell taken along line A-A in FIG. 2.

FIG. 1 is an exploded perspective view showing a solid oxide fuel cell according to one embodiment of the present invention. FIG. 2 is a perspective view illustrating a state that the unit cells of the solid oxide fuel cell shown in FIG. 1 are combined together. FIG. 3 is a perspective view showing one of the unit cells shown in FIG. 1. FIG. 4 is a section view of the solid oxide fuel cell taken along line A-A in FIG. 2.

Referring to FIGS. 1 and 2, the solid oxide fuel cell according to one embodiment of the present invention includes a plurality of unit cells 100a, 100b, 100c and 100d, a plurality of electricity collecting plates 140 and 141 and a pair of side plates 150 and 151.

Referring to FIGS. 3 and 4, each of the unit cells 100 includes a support body block 110, an air electrode 120, a fuel electrode 121 and a plurality of electricity collecting layers 130 and 131.

An electrolyte support body block or a porous electrode support body block can be used as the support body block 110. The electrolyte support body block may be formed of an ionic conductive material such as yttria stabilized zirconia (YSZ), $CeO_2$-based electrolyte, $Bi_2O_3$-based electrolyte or $LaGaO_3$-based electrolyte.

The porous electrode support body block is usually formed of a mixture of nickel oxide and yttria stabilized zirconia (NiO—YSZ). In the event that the porous electrode support body block is used as the support body block 110, an electrolyte layer is formed on the surface of the porous electrode support body block. Use of the porous electrode support body block makes it possible to form the electrolyte layer with a reduced thickness.

A porous conductive support body block having an electrode layer, an electrolyte layer and an opposite electrode layer formed on the surface thereof may be used as the support body block 110. The porous conductive support body block is produced by adding a suitable amount of pore formers such as graphite or starch to metallic powder or oxide powder reducible to metal, mixing the powder with a binder, a plasticizer or a dispersant to thereby prepare slurry, filling the slurry into a ceramic mold and drying the slurry into a molded body, and then sintering the molded body under a reducing atmosphere.

Referring again to FIGS. 3 and 4, the support body block 110 includes a first surface 111 which is equivalent to an upper surface in FIG. 3 and a second surface 112 which is equivalent to a lower surface in FIG. 3. The support body block 110 further includes a plurality of first channels 113, each of which has a lateral end opened at one lateral side of the support body block 110, an first-surface-side open end fully opened on the first surface 111 and a second-surface-side open end partially opened on the second surface 112. The support body block 110 further includes a plurality of second channels 114 arranged between the first channels 113. Each of the second channels 114 has a lateral end opened at the other lateral side of the support body block 110, a first-surface-side open end partially opened on the first surface 111 and a second-surface-side open end fully opened on the second surface 112.

While the first-surface-side open end of each of the first channels 113 is fully opened on the first surface 111, the second-surface-side open end of each of the first channels 113 is partially opened on the second surface 112 to thereby form a first path 115. The remaining portion of the second-surface-side open end of each of the first channels 113 is closed. Conversely, the second-surface-side open end of each of the second channels 114 is fully opened on the second surface 112. The first-surface-side open end of each of the second channels 114 is partially opened on the first surface 111 to thereby form a second path 116.

The support body block 110 further includes a plurality of wall portions 117 arranged between the first channels 113 and the second channels 114. The wall portions 117 may be formed to have a thickness of several tens micrometers. The depth of each of the channels 113 and 114 may be about thirty times as large as the width of each of the wall portions 117. For instance, if the thickness of each of the wall portions 117 is 50 μm, the depth of each of the channels 113 and 114 may be about 1,500 μm. The wall portions 117 serve as an electrolyte. Therefore, as the thickness of the wall portions 117 becomes smaller, the ion conductivity grows higher. This makes it possible to increase the power generation efficiency and to reduce the operating temperature.

The air electrode (cathode) 120 is formed on the inner surface of each of the first channels 113. The air electrode 120 may be made of $LaSrMnO_3$. The air electrode 120 can be formed by electrochemical vapor deposition or many other methods, e.g., a method of mixing a material for the formation of the air electrode 120 with a binder to produce a paste and then coating the paste on the inner surface of each of the first channels 113.

The fuel electrode (anode) 121 is formed on the inner surface of each of the second channels 114. The fuel electrode 121 may be made of Ni—YSZ (cermet). The fuel electrode 121 can be formed by many different methods such as electrochemical vapor deposition and paste coating.

A first electricity collecting layer 130 and a second electricity collecting layer 131 electrically connected to the air electrode 120 and the fuel electrode 121 are formed on the first surface 111 and the second surface 112 of the support body block 110. The first electricity collecting layer 130 formed on the first surface 111 is electrically connected to the air electrode 120 but is not connected to the fuel electrode 121. On the contrary, the second electricity collecting layer 131 formed on the second surface 112 is electrically connected to only the fuel electrode 121. In the solid oxide fuel cell according to the present invention, the electricity collecting layers 130 and 131 are not formed on the opposite lateral surfaces of the support body block 110 but on the first surface 111 as an upper surface and the second surface 112 as a lower surface.

As shown in FIG. 1, the unit cells 100 are stacked one above another, thereby forming a unit cell stack. A stacking method will now be described on the basis of the third highest unit cell 100c and the lowermost unit cell 100d among the unit cells 100 shown in FIG. 1.

According to the present invention, the upper unit cell 100c and the lower unit cell 100d are joined to each other by rotating 180 degrees the lower unit cell 100d such that the lower surface of the upper unit cell 100c is in a mirror-symmetrical relationship with the upper surface of the lower unit cell 100d. Due to the rotation of the lower unit cell 100d, the upper surface of the lower unit cell 100d becomes the second surface 112 and the lower surface of the lower unit cell 100d becomes the first surface 111. In other words, the upper unit cell 100c and the lower unit cell 100d are combined together by rotating 180 degrees the lower unit cell 100d such that the second surface 112 of the upper unit cell 100c makes contact with the second surface 112 of the lower unit cell 100d.

Once the unit cells 100 are stacked one above another, the channels 113 and 114 of the upper unit cell 100c and the channels 113 and 114 of the lower unit cell 100d are connected to each other. At this time, the lower surface of the upper unit cell 100c is in a mirror-symmetrical relationship with the upper surface of the lower unit cell 100d. Therefore, the first paths 115 of the first channels 113 of the upper unit cell 100c are connected to the first paths 115 of the first channels 113 of the lower unit cell 100d. The fully opened lower ends of the second channels 114 of the upper unit cell 100c are connected to the fully opened upper ends of the second channels 114 of the lower unit cell 100d.

While four unit cells are stacked in the example shown in FIG. 1, the number of unit cells stacked is not limited to four but may be arbitrarily changed.

Referring again to FIG. 1, a first electricity collecting plate 140 and a pair of second electricity collecting plates 141 are arranged between the unit cells 100. The first electricity collecting plate 140 is arranged between the first surfaces 111 of the unit cells 100b and 100c adjoining each other. The second electricity collecting plate 141 are arranged between the second surfaces 112 of the unit cells 100a and 100b and between the second surfaces 112 of the unit cells 100c and 100d. The first electricity collecting plate 140 is electrically connected to the first electricity collecting layers 130 formed on the first surfaces 111. The second electricity collecting plates 141 are electrically connected to the second electricity collecting layers 131 formed on the second surfaces 112.

Since the electricity collecting plates 140 and 141 make contact with the first surfaces 111 and the second surfaces 112 of the support body block 110, electrons generated in the fuel electrode 121 move a short distance to reach the second electricity collecting plates 141. Electrons emitted from the first electricity collecting plate 140 move a short distance to reach the air electrode 120. Accordingly, it is possible to reduce the internal loss of electrons and to increase the power generation efficiency.

Figure 5:
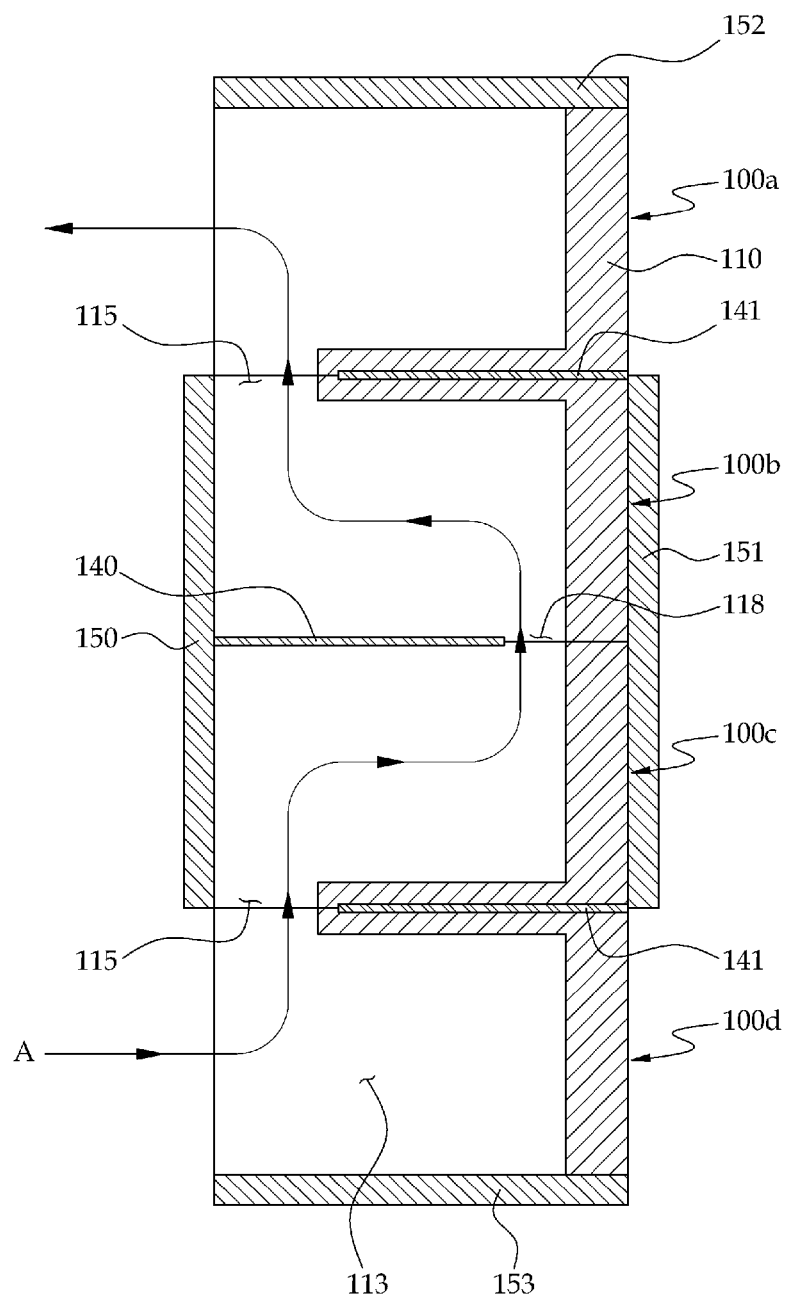
FIG. 5 is a view showing the flow of an air in the solid oxide fuel cell shown in FIG. 1.

The first electricity collecting plate 140 arranged between the first surfaces 111 of the unit cells 100b and 100c partially closes the fully opened ends of the first channels 113 existing on the first surfaces 111, thereby forming a third path 118 (see FIG. 5). Each of the second electricity collecting plates 141 partially closes the fully opened ends of the second channels 114 existing on the second surfaces 112, thereby forming a fourth path 119 (see FIG. 6). In order to allow the air and the fuel to flow zigzag through the channels 113 and 114, it is preferable to arrange the first electricity collecting plate 140 and the second electricity collecting plates 141 such that the paths 115 and 118 or the paths 116 and 119 are formed in the diametrically opposite positions.

The first electricity collecting plate 140 and the second electricity collecting plates 141 protrude in the opposite directions from each other. Accordingly, electricity can be easily collected by connecting the first electricity collecting plate 140 and the second electricity collecting plates 141 with an electrically conductive paste.

In the solid oxide fuel cell of the present invention, the upper unit cell 100 and the lower unit cell 100 are joined to each other by rotating 180 degrees the lower unit cell 100 such that the second surface 112 of the upper unit cell 100 makes contact with the second surface 112 of the lower unit cell 100. The electricity collecting plates 140 and 141 are arranged between the unit cells 100. Therefore, as compared with the conventional fuel cells in which the electricity collecting plates 140 and 141 are arranged on the lateral surfaces of the unit cells 100, it is possible to reduce the number of the electricity collecting plates by one half.

Referring again to FIG. 1, a first side plate 150 and a second side plate 151 are attached to the opposite lateral surfaces of the stack of the unit cells 100. The first side plate 150 and the second side plate 151 serve to close the channels 113 and 114 of some of the unit cells 100. The first side plate 150 and the second side plate 151 do not close the channels 113 and 114 of the uppermost and lowermost unit cells 100a and 100d. The reason is that the channels 113 and 114 of the uppermost and lowermost unit cells 100a and 100d are used as inlets and outlets through which the air or the fuel is introduced and discharged. The side plates 150 and 151 may be made of a material lower in porosity than the support body block 110 or glass or glass ceramics. The support body block and the side plates may be directly bonded to each other under a high temperature and a high pressure or may be encapsulated by an encapsulating material such as glass ceramics or the like.

Cover plates 152 and 153 are attached to the uppermost and lowermost unit cells 100a and 100d. Just like the side plates 150 and 151, the cover plates 152 and 153 may be made of a material lower in porosity than the support body block 110 or glass or glass ceramics.

Figure 6:
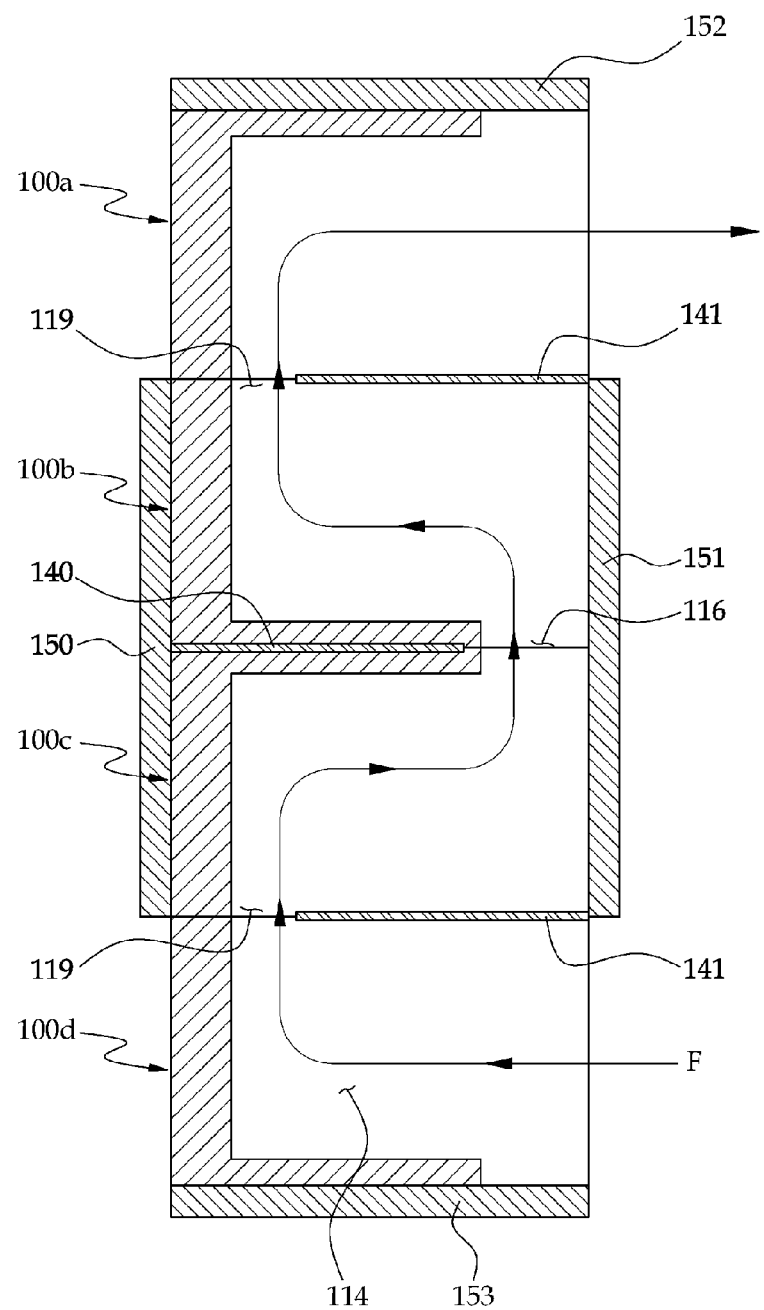
FIG. 6 is a view showing the flow of fuel in the solid oxide fuel cell shown in FIG. 1.

FIG. 5 is a view showing the flow of an air in the solid oxide fuel cell shown in FIG. 1. FIG. 6 is a view showing the flow of fuel in the solid oxide fuel cell shown in FIG. 1. The electrodes and the electricity collecting layers are not shown in FIGS. 5 and 6. Referring to FIGS. 5 and 6, an air A is supplied to the first channels 113 of the solid oxide fuel cell. Reducing fuel F such as hydrogen or the like is supplied to the second channels 114. The air A and the fuel F are introduced through the channels 113 and 114 of the lowermost unit cell 100d. Then, the air A and the fuel F flow zigzag along the channels 113 and 114 of the upper unit cells.

Referring to FIG. 5, the air A is introduced through the first channels 113 of the lowermost unit cell 100d. The air A passes through the first paths 115, the first channels 113 of the second lowest unit cell 100c, the third paths 118, the first channels 113 of the third lowest unit cell 100b and the first paths 115. Then, the air A is discharged to the outside through the first channels 113 of the uppermost unit cell 100a.

Referring to FIG. 6, the fuel F is introduced through the second channels 114 of the lowermost unit cell 100d. The fuel F passes through the fourth paths 119, the second channels 114 of the second lowest unit cell 100c, the second paths 116, the second channels 114 of the third lowest unit cell 100b and the fourth paths 119. Then, the fuel F is discharged to the outside through the second channels 114 of the uppermost unit cell 100a.

Reduction reaction of oxygen occurs in the air electrode 120 of the first channels 113, thereby generating oxygen ions. The oxygen ions move toward the second channels 114 through the wall portions 117. The oxygen ions thus moved react with hydrogen supplied into the second channels 114, thus generating water. In the air electrode 120, oxygen molecules are ionized by electrons, in which process electrons are consumed. In the fuel electrode 121, oxygen ions react with hydrogen, in which process electrons are generated. If the air electrode 120 and the fuel electrode 121 are connected to each other, electrons can flow to thereby generate electricity.

With the solid oxide fuel cell of the present invention, it is possible to significantly increase the area of the air electrodes 120 and the fuel electrodes 121, i.e., the electrode area per unit volume. This makes it possible to achieve high-efficiency power generation. If the side plates 150 and 151 and the cover plates 152 and 153 are made of a material whose thermal expansion coefficient does not differ from the thermal expansion coefficient of the support body blocks 110 of the unit cells 100, the stack of the unit cells 100 can enjoy increased durability and reliability. Thus, even when repeatedly operated and stopped, the solid oxide fuel cell is restrained from being broken by thermal stresses. Since the unit cells and the stack thereof are structurally simple, it is possible to reduce the size and weight of a large-capacity power generation system.

Next, a method of manufacturing the unit cell of the aforementioned solid oxide fuel cell will be described with reference to the accompanying drawings. FIGS. 7 through 11 are process views for explaining a method of manufacturing the unit cell shown in FIG. 3.

Figure 7:
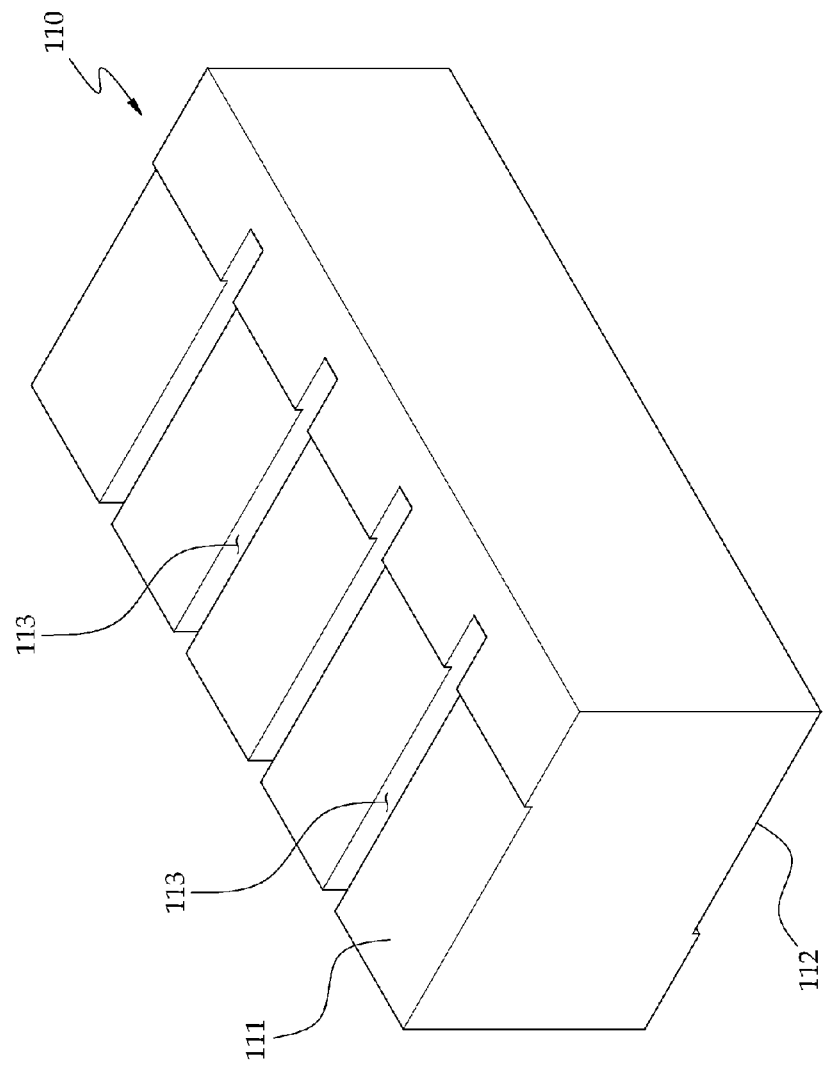
FIGS. 7 through 11 are process views for explaining a method of manufacturing the unit cell shown in FIG. 3.
Figure 8:
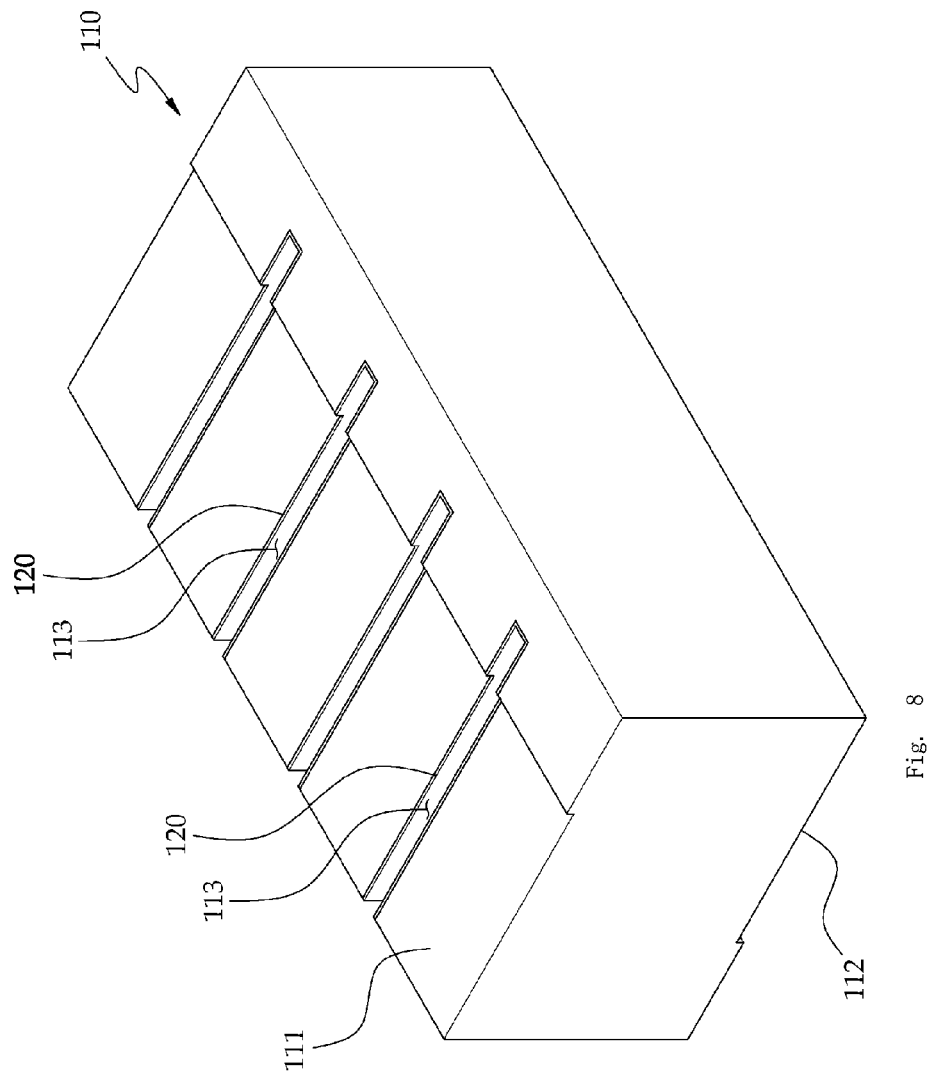

First, as shown in FIG. 7, the support body block 110 is slit to form the first channels 113. Then, a paste obtained by mixing an air electrode material and a binder is coated on the inner surfaces of the first channels 113 and is subjected to heat treatment for two hours at a maximum temperature of about 1,100° C., thereby forming the air electrodes 120 on the inner surfaces of the first channels 113 as shown in FIG. 8. The coating of the air electrode material is usually performed in such a manner that $LaSrMnO_3+YSZ$ is first coated and $LaSrMnO_3$ is coated subsequently.

Figure 9:
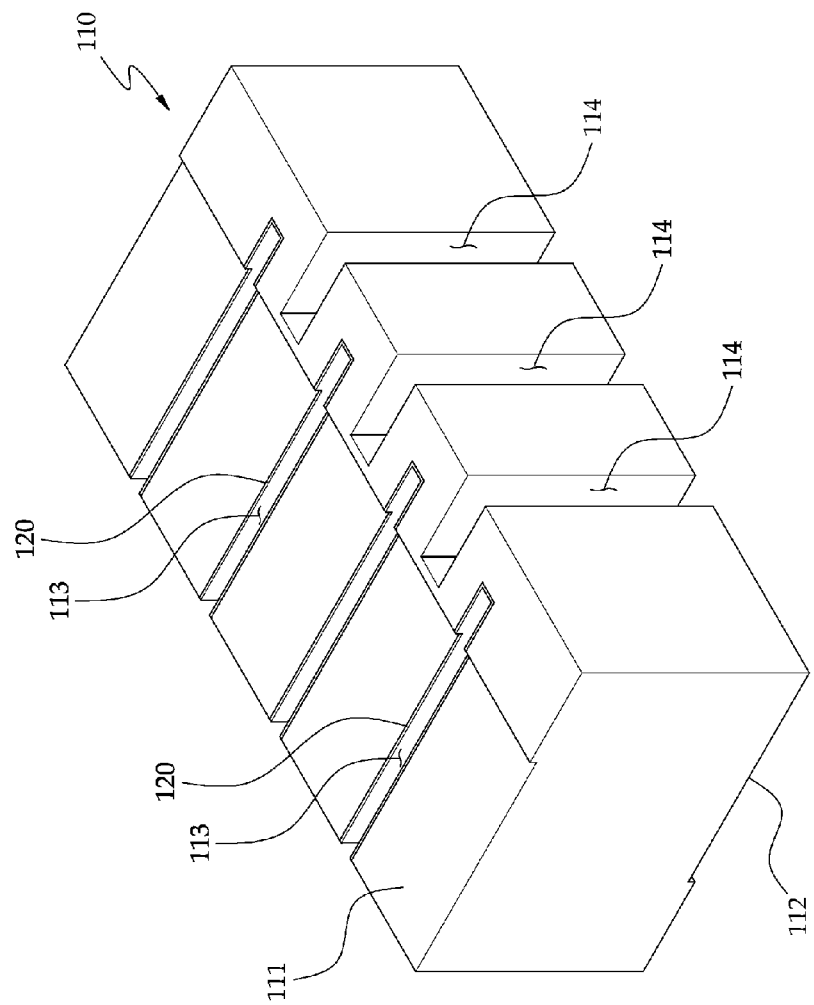

Next, as shown in FIG. 9, the portions of the support body block 110 existing between the first channels 113 are slit from the opposite side of the first channels 113, thereby forming the second channels 114. In this manner, the wall portions 117 as electrolyte layers having a thickness of several tens micrometers can be easily formed between the first channels 113 and the second channels 114.

Figure 10:
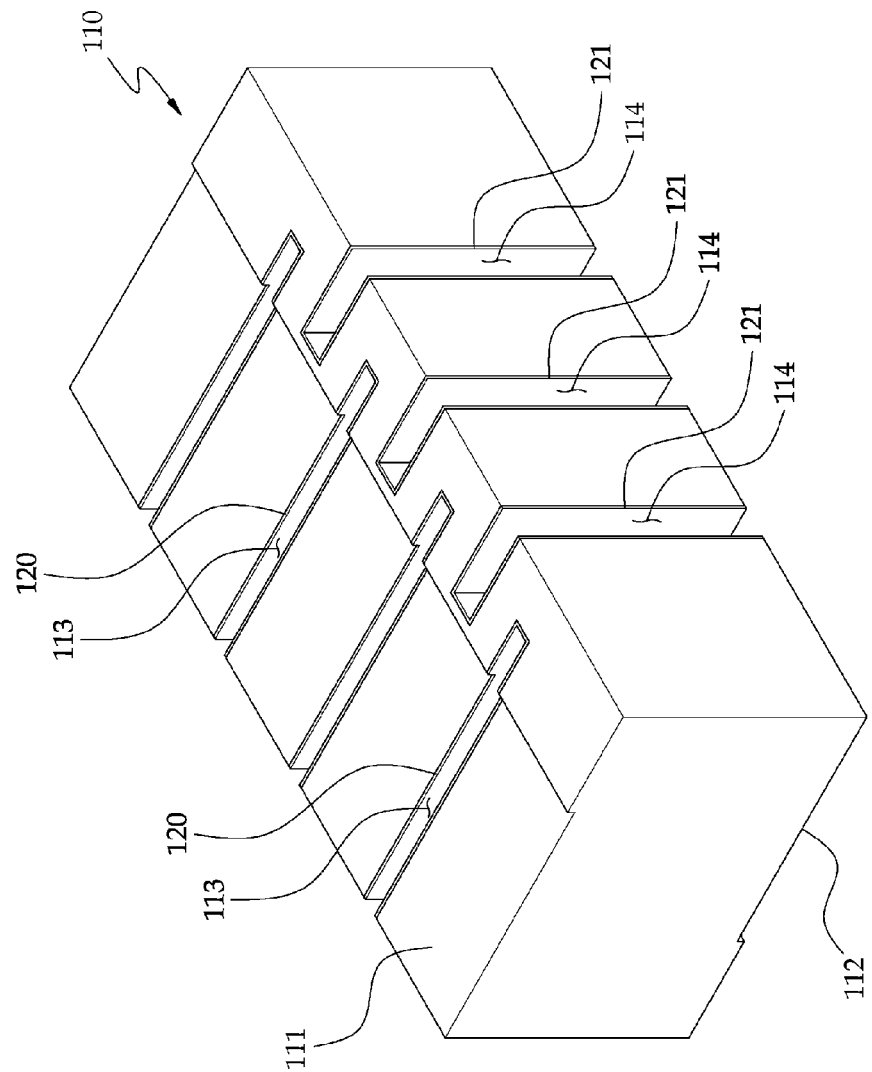

Then, a paste obtained by mixing a fuel electrode material and a binder is coated on the inner surfaces of the second channels 114 and is subjected to heat treatment, thereby forming the fuel electrodes 121 on the inner surfaces of the second channels 114 as shown in FIG. 10.

Figure 11:
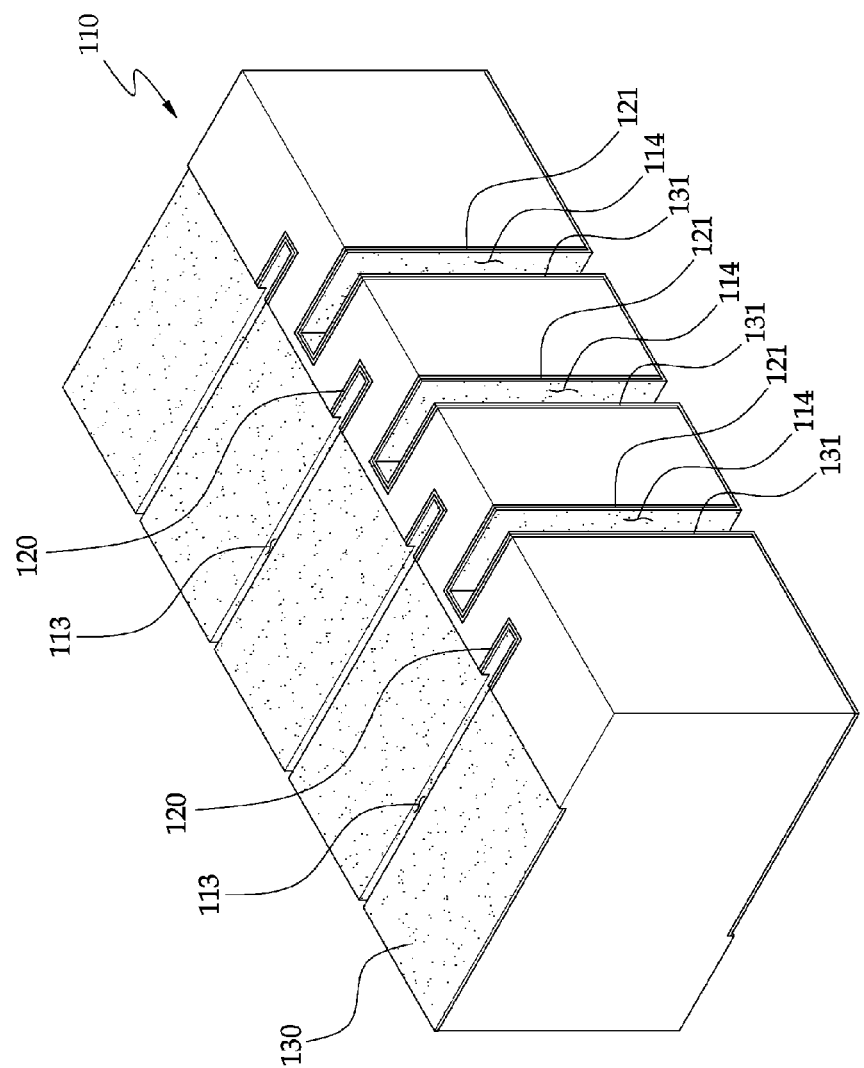

Then, as shown in FIG. 11, metallic powder is coated on the air electrodes 120 and the first surface 111 and is subjected to heat treatment, thereby forming the first electricity collecting layer 130. In addition, metallic powder is coated on the fuel electrodes 121 and the second surface 112 and is subjected to heat treatment, thereby forming the second electricity collecting layer 131. The metallic powder may be coated in the form of a paste. Noble metal such as platinum, silver and palladium may be used as the metallic powder coated on the air electrodes 120 and the first surface 111. The noble metal can also be used as the metallic powder coated on the fuel electrodes 121 and the second surface 112. Since the second channels 114 are kept in a reducing atmosphere, nickel is usually used as the second electricity collecting layer 131 for the fuel electrodes 121. The air electrodes 120 and the fuel electrodes 121 are electrically conductive. Therefore, instead of using metallic powder, the air electrodes 120 and the fuel electrodes 121 may be coated even on the first surface 111 and the second surface 112 to form the electricity collecting layers.

The unit cells manufactured in this manner are stacked one above another by rotating 180 degrees the lower unit cell 100 such that the lower surface of the upper unit cell 100 is in a mirror-symmetrical relationship with the upper surface of the lower unit cell 100. At this time, the electricity collecting plates 140 and 141 are arranged between the unit cells 100.

Then, the first side plate 150 and the second side plate 151 are attached to the opposite lateral surfaces of the stack of the unit cells 100. The cover plates 152 and 153 are attached to the uppermost and lowermost unit cells 100a and 100d.

Thereafter, the electricity collecting plates 140 and 141 having the same polarity are connected to each other.

While one preferred embodiment of the present invention has been described above, it will be apparent to those skilled in the art that various changes, modifications and substitutions may be made without departing from the scope of the invention defined in the claims.

For example, while the electricity collecting plates are used as electricity collectors in the aforementioned embodiment, it may be possible to use conductive wires, e.g., platinum wires, as the electricity collectors. At this time, plates made of the same material as the support body block or glass or glass ceramics may be arranged to partially close the channels of the unit cells so that the air and the fuel can flow zigzag along the channels.

What is claimed is:

1. A solid oxide fuel cell, comprising:
  a plurality of unit cells each including a support body block, the support body block including a first surface, a second surface parallel to the first surface, a plurality of first channels extending in a first direction in a parallel relationship with the first surface and serving as flow paths through which an air flows and a plurality of second channels existing between the first channels and serving as flow paths through which fuel flows, the first channels having first-surface-side open ends and second-surface-side open ends, the second channels having first-surface-side open ends and second-surface-side open ends, each of the unit cells further including air electrodes (cathodes) formed on inner surfaces of the first channels, fuel electrodes (anodes) formed on inner surfaces of the second channels, a first electricity collecting layer formed on the first surface and electrically connected to the air electrodes and a second electricity collecting layer formed on the second surface and electrically connected to the fuel electrodes;
  a first side plate and a second side plate respectively attached to opposite lateral surfaces of the unit cells and configured to close lateral ends of the first channels and the second channels;
  a first electricity collector electrically connected to the first electricity collecting layer and arranged to partially close the first-surface-side open ends of the first channels of the unit cells; and
  a second electricity collector electrically connected to the second electricity collecting layer and arranged to partially close the second-surface-side open ends of the second channels of the unit cells,
  wherein the unit cells are stacked one above another such that the first channels of the unit cells adjoining each other are connected to one another to form the flow paths through which the air flow and such that the second channels of the unit cells adjoining each other are connected to one another to form the flow paths through which the fuel flow, the first surfaces of the unit cells adjoining each other arranged to face each other with the first electricity collector interposed therebetween, the second surfaces of the unit cells adjoining each other arranged to face each other with the second electricity collector interposed therebetween.

2. The solid oxide fuel cell of claim 1, wherein the second-surface-side open ends of the first channels are partially opened to form first paths through which the air passes and the first-surface-side open ends of the second channels are partially opened to form second paths through which the fuel passes.

3. The solid oxide fuel cell of claim 2, wherein the first electricity collector is arranged to partially close the first-surface-side open ends of the first channels to thereby form third paths such that the air flows zigzag along the first channels and the second electricity collector are arranged to partially close the second-surface-side open ends of the second channels to thereby form fourth paths such that the fuel flows zigzag along the second channels.

4. The solid oxide fuel cell of claim 1, wherein the unit cells are arranged such that a lower surface of an upper unit cell is in a mirror-symmetrical relationship with an upper surface of a lower unit cell.

5. The solid oxide fuel cell of claim 1, wherein the support body block is an electrolyte support body block, or a porous electrode support body block having an electrolyte layer formed on one surface thereof, or a porous electrically-conductive support body block having an electrode layer, an electrolyte layer and an opposite electrode layer.

6. The solid oxide fuel cell of claim 1, wherein the first electricity collector and the second electricity collector protrude in opposite directions from each other.

* * * * *